April 1, 1924.
1,488,824
C. W. MILLET
CASTER WHEEL
Filed Jan. 3, 1920
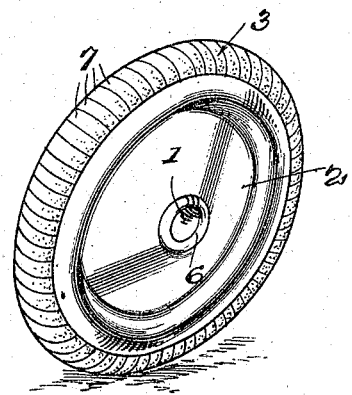
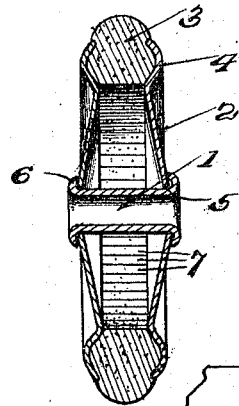
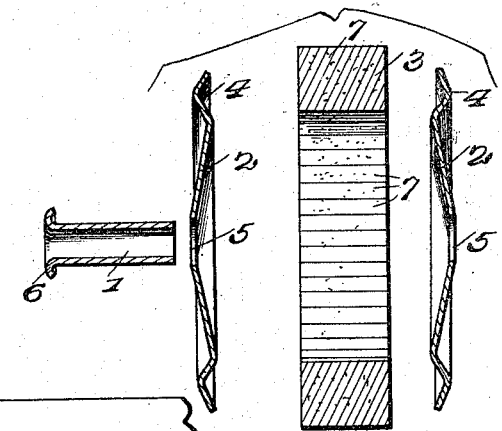
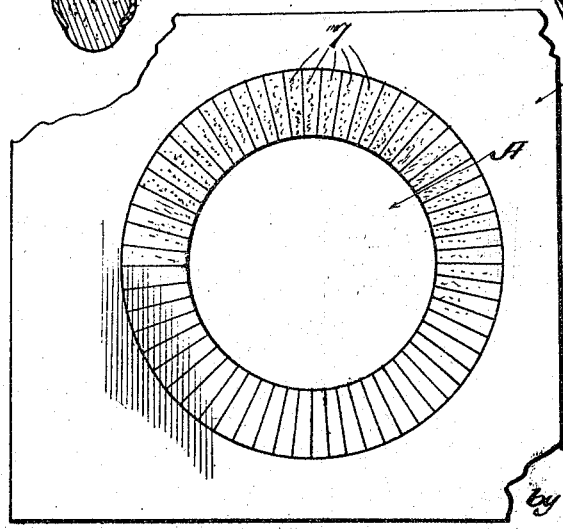
Inventor.
C. W. Millet.

Patented Apr. 1, 1924.

1,488,824

UNITED STATES PATENT OFFICE.

CHARLES W. MILLET, OF EVANSVILLE, INDIANA.

CASTER WHEEL.

Application filed January 3, 1920. Serial No. 349,319.

*To all whom it may concern:*

Be it known that I, CHARLES W. MILLET, a citizen of the United States, residing at Evansville, in the county of Vanderburg and State of Indiana, have invented certain new and useful Improvements in Caster Wheels, of which the following is a specification.

This invention relates to caster and similar wheels and has as one of its objects to provide a wheel of this type having its tread made up of a plurality of paper or similar fiber segments so arranged that there will be no likelihood of tearing away of the tread and so that the tread will be exceptionally durable.

It has been proposed to manufacture caster and similar wheels having their treads of paper and comprising a number of annular disks assembled face to face. It has been found that a paper tread thus constructed will not be durable and will be extremely liable to become soon torn or worn away thus impairing or destroying the efficiency of the wheel, and this is due to the fact that in a tread so constructed, comparatively few of the fibers extend radial to the axis of the wheel, the greater number extending chordal to the circumference of the wheel. The present invention therefore has as its object to greatly improve upon this proposed construction by forming the tread of the wheel of a plurality of segments of paper, each segment being so cut and arranged that the fibres therein, when the segment is assembled with others of its kind to form the tread of the wheel, will extend radial to the axis of the wheel and therefore all terminate at the tread surface.

Another object of the invention is to provide a novel means for holding the tread segments in their assembled relation and against radial displacement.

In the accompanying drawing:

Figure 1 is a perspective view of a wheel constructed in accordance with the present invention;

Fig. 2 is a diametric section therethrough;

Fig. 3 is a similar view illustrating the parts comprising the wheel disassembled;

Fig. 4 is a view illustrating the manner in which the tread segments are arranged and supported in an annular series in the manufacture of the wheel.

In the drawing the wheel is illustrated as comprising a hub 1, side plates or disks 2, and a tread 3. For a purpose to be presently explained, the side disks 2 are formed each in its marginal portion in its inner face with an annular channel or groove 4 preferably formed by stamping up the blank from which the disk is made. The disks are provided axially with openings 5 and they are secured together by fitting the ends of the hub through the openings 5 and overturning or riveting down the ends of the said hub as indicated by the numeral 6.

As before stated, the tread of the wheel is made up of a number of segments of paper or similar fibrous and semi-yieldable material and these segments are arranged in an annular series as clearly shown in Fig. 4 of the drawings, and in the manufacture of the wheel they are assembled in such series within an opening A formed in a block B, in which opening they may be retained while the side disks 2 are applied and secured together by turning down the ends of the hub. Each segment, indicated by the numeral 7, is preferably of multi-ply structure and the plies are so arranged that the fibers in all of the plies will extend in a common direction. The segments are likewise so cut that the lines of extent of the fibers will be radial to the axis of the wheel when the segments are assembled to complete the tread.

In manufacturing the wheel, the side disks 2 are subjected to considerable pressure at the time they are secured together and as they are subjected to pressure, their marginal portions will be caused to firmly compress and bind, in an endwise direction, the segments 7 of the tread. In this manner the ends of the segments or, in other words, the opposite sides of the tread will be pressed into the grooves or channels 4 as clearly illustrated in Fig. 2 of the drawings, and the segments are securely gripped between the marginal portions of the side disks and are held in their assembled relation, and likewise the tread as a whole is securely braced against radial displacement.

After all of the parts of the wheel have been assembled in the manner above described, any desired shape may be given the tread by any suitable method of dressing.

Having thus described the invention, what is claimed as new is:

A caster comprising mating plates provided with central apertures and opposing marginal channels, a hub member securing the plates in spaced relation, a tread member having an annular waist line dividing the tread into substantially an inner and an outer half, its inner annular half being firmly held in said channels and its outer annular half extending beyond the marginal edges of the channels, said tread member being composed of a plurality of fibrous disks arranged with the fibers in radial planes of the caster.

In testimony whereof I affix my signature.

CHARLES W. MILLET. [L. S.]